US011920576B2

(12) United States Patent
Yatsu

(10) Patent No.: US 11,920,576 B2
(45) Date of Patent: Mar. 5, 2024

(54) CRYOPUMP AND METHOD OF MONITORING CRYOPUMP

(71) Applicant: SUMITOMO HEAVY INDUSTRIES, LTD., Tokyo (JP)

(72) Inventor: Takahiro Yatsu, Tokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 460 days.

(21) Appl. No.: 17/188,408

(22) Filed: Mar. 1, 2021

(65) Prior Publication Data

US 2021/0180579 A1 Jun. 17, 2021

Related U.S. Application Data

(63) Continuation of application No. PCT/JP2019/030301, filed on Aug. 1, 2019.

(30) Foreign Application Priority Data

Sep. 3, 2018 (JP) ................................ 2018-164405

(51) Int. Cl.
*F04B 37/08* (2006.01)
*F04B 37/14* (2006.01)
*F04B 49/06* (2006.01)

(52) U.S. Cl.
CPC .............. *F04B 37/08* (2013.01); *F04B 37/14* (2013.01); *F04B 49/065* (2013.01); *F04B 2201/0801* (2013.01); *F05B 2210/12* (2013.01)

(58) Field of Classification Search
CPC ........ F04B 37/08; F04B 37/14; F04B 49/065; F04B 2201/0801; F04B 37/16; F04B 37/085; F05B 2210/12
See application file for complete search history.

(56) References Cited

U.S. PATENT DOCUMENTS 5,582,017 A 12/1996 Noji et al.
10,456,706 B2 10/2019 Oikawa
(Continued)

FOREIGN PATENT DOCUMENTS

JP S60-256574 A 12/1985
JP H01-080777 A 3/1989
(Continued)

*Primary Examiner* — Henry T Crenshaw
*Assistant Examiner* — Kamran Tavakoldavani
(74) *Attorney, Agent, or Firm* — Michael Best & Friedrich LLP

(57) ABSTRACT

A cryopump includes an accommodation space for a condensed layer of gas, a first-stage cryopanel having an inner surface of the first-stage cryopanel disposed so as to surround the accommodation space, and a second-stage cryopanel disposed so as to be surrounded by the inner surface of the first-stage cryopanel together with the accommodation space. A first-stage heat load is incident on the inner surface of the first-stage cryopanel from outside the cryopump through an intake port, and the gas enters the accommodation space from outside the cryopump. The first-stage cryopanel is cooled to a temperature higher than a condensation temperature of the gas, the second-stage cryopanel is cooled to a temperature of the condensation temperature or less, and the condensed layer is deposited. The cryopump monitors the amount of condensed gas in the accommodation space based on a change in the first-stage heat load.

11 Claims, 7 Drawing Sheets

10

(56) References Cited

U.S. PATENT DOCUMENTS

| | | | | |
|---|---|---|---|---|
| 2012/0285182 A1* | 11/2012 | Ando | F04B 37/08 | 62/55.5 |
| 2013/0227968 A1* | 9/2013 | Takahashi | B01D 8/00 | 62/55.5 |
| 2014/0345300 A1* | 11/2014 | Takahashi | F04B 37/08 | 62/55.5 |

FOREIGN PATENT DOCUMENTS

| | | |
|---|---|---|
| JP | H07-293438 A | 11/1995 |
| JP | H11-214199 A | 8/1999 |
| JP | 2015-001186 A | 1/2015 |

* cited by examiner

CRYOPUMP AND METHOD OF MONITORING CRYOPUMP

RELATED APPLICATIONS

The contents of Japanese Patent Application No. 2018-164405, and of International Patent Application No. PCT/JP2019/030301, on the basis of each of which priority benefits are claimed in an accompanying application data sheet, are in their entirety incorporated herein by reference.

BACKGROUND

Technical Field

Certain embodiments of the present invention relate to a cryopump and a method of monitoring a cryopump.

Description of Related Art

A cryopump is a vacuum pump which captures gas molecules on a cryopanel cooled to a cryogenic temperature by condensation or adsorption to pump the gas molecules. The cryopump is generally used to realize a clean vacuum environment which is required for a semiconductor circuit manufacturing process or the like. Since the cryopump is a so-called gas storage type vacuum pump, it is necessary to regenerate the captured gas periodically to be discharged to an outside.

SUMMARY

According to an aspect of the present invention, there is provided a cryopump including an accommodation space for a condensed layer of gas. The cryopump includes a first-stage cryopanel that is cooled to a temperature higher than a condensation temperature of the gas and includes an inner surface of the first-stage cryopanel disposed so as to surround the accommodation space; a second-stage cryopanel that is cooled to a temperature equal to or lower than the condensation temperature of the gas, on which the condensed layer of the gas is deposited, and that is disposed so as to be surrounded by the inner surface of the first-stage cryopanel together with the accommodation space; a cryopump intake port that allows a passage of a first-stage heat load incident on the inner surface of the first-stage cryopanel from outside the cryopump and the gas entering the accommodation space from outside the cryopump; and a second-stage cryopanel monitoring unit that monitors an amount of condensed gas in the accommodation space based on a change in the first-stage heat load.

According to another aspect of the invention, there is provided a method of monitoring a cryopump. The cryopump includes a first-stage cryopanel having an inner surface of the first-stage cryopanel disposed so as to surround an accommodation space for a condensed layer of gas, and a second-stage cryopanel disposed so as to be surrounded by the inner surface of the first-stage cryopanel together with the accommodation space, the method includes cooling the first-stage cryopanel to a temperature higher than a condensation temperature of the gas and cooling the second-stage cryopanel to a temperature equal to or lower than the condensation temperature of the gas; depositing the condensed layer of the gas that enters the accommodation space from outside the cryopump through a cryopump intake port on the second-stage cryopanel; and monitoring an amount of condensed gas in the accommodation space based on a change in the first-stage heat load incident on the inner surface of the first-stage cryopanel from outside the cryopump through the cryopump intake port.

DETAILED DESCRIPTION

Figure 1:
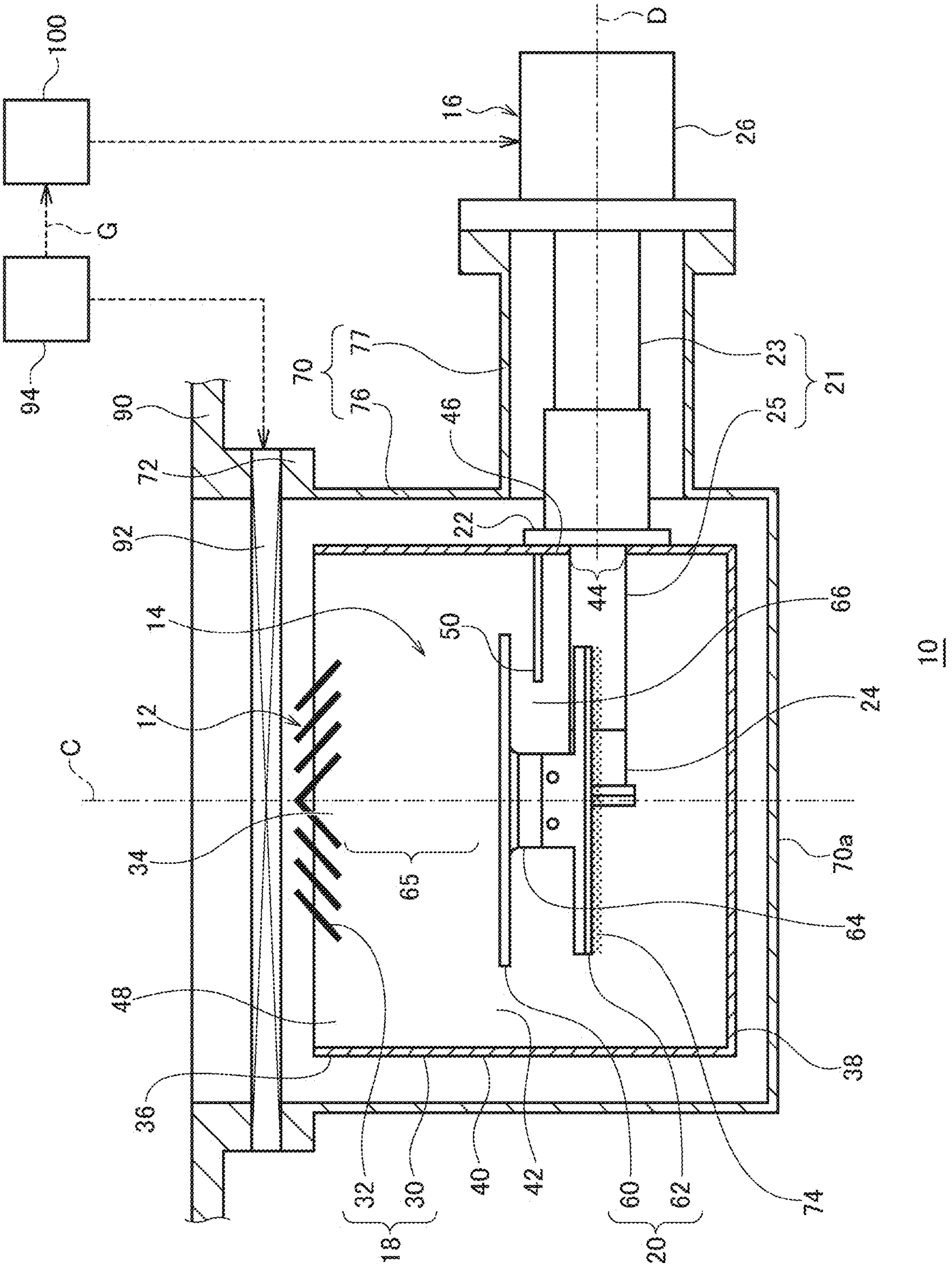
FIG. 1 is a diagram schematically showing a cryopump according to an embodiment.

A cryopump is normally provided with two types of cryopanels having different temperatures. A low temperature cryopanel is cooled to a cooling temperature of, for example, approximately 20K or less so as to condense a gas having a relatively high vapor pressure such as argon or nitrogen on the surface, and a high temperature cryopanel is cooled to a cooling temperature of, for example, approximately 80K or higher so that such gas does not condense. As the cryopump is used, a condensed layer of gas grows on a low-temperature cryopanel and can eventually come into contact with a high-temperature cryopanel. As a result, the gas is vaporized again at a contact part between the high-temperature cryopanel and the condensed layer and released to the surroundings. Thereafter, the cryopump cannot fully fulfill an original role. Therefore, the condensed layer present on the low-temperature cryopanel at the time of contact provides the maximum amount of gas (also referred to as a storage limit or maximum storage amount) that can be stored in the cryopump.

It is desirable to provide a technique for predicting during use of the cryopump that the amount of gas stored in the cryopump approaches the storage limit.

Any combination of the constituent elements described above, or replacement of constituent elements or expressions of the present invention with each other between methods, apparatuses, systems, or the like is also valid as an aspect of the present invention.

Hereinafter, modes for carrying out the present invention will be described in detail with reference to the drawings. In the description and the drawings, identical or equivalent constituent elements, members, and processing are denoted by the same reference numerals, and overlapping description is omitted appropriately. The scales or shapes of the respective parts shown in the drawings are set for convenience in order to facilitate description and are not interpreted to a limited extent unless otherwise specified. Embodiments are exemplification and do not limit the scope of the present invention. All features described in the embodiments or combinations thereof are not necessarily essential to the invention.

FIG. 1 is a diagram schematically showing a cryopump 10 according to an embodiment. The cryopump 10 is attached, for example, to a vacuum chamber 90 of a sputtering device, a vapor deposition device, or other vacuum process device, and is used to increase a degree of vacuum inside the vacuum chamber 90 to a level required for a desired vacuum process. The cryopump 10 includes a cryopump intake port (hereinafter, also referred to as an "intake port") 12 for receiving a gas to be pumped from the vacuum chamber. The gas enters an internal space 14 of the cryopump 10 through the intake port 12.

The cryopump 10 may be intended to be installed and used in a vacuum chamber in the shown direction, that is, with a posture of the intake port 12 facing upward. However, a posture of the cryopump 10 is not limited thereto, and the cryopump 10 may be installed in the vacuum chamber in another direction.

In the following, there is a case where the terms "axial direction" and "radial direction" are used in order to express the positional relationship between constituent elements of the cryopump 10 in an easily understandable manner. The axial direction represents a direction passing through the intake port 12 (a direction along of a cryopump center axis C passing through a center of the intake port 12 in FIG. 1), and the radial direction represents a direction along the intake port 12 (a direction perpendicular to the center axis C). For convenience, with respect to the axial direction, there is a case where the side relatively close to the intake port 12 is referred to as an "upper side" and the side relatively distant from the intake port 12 is referred to as a "lower side". That is, there is a case where the side relatively distance from the bottom of the cryopump 10 is referred to as an "upper side" and the side relatively close to the bottom of the cryopump 10 is referred to as a "lower side". With respect to the radial direction, there is a case where the side close to the center (the center axis C in FIG. 1) of the intake port 12 is referred to as an "inner side" and the side close to the peripheral edge of the intake port 12 is referred to as an "outer side". Such expressions are not related to the disposition when the cryopump 10 is attached to the vacuum chamber. For example, the cryopump 10 may be attached to the vacuum chamber with the intake port 12 facing downward in the vertical direction.

Further, there is a case where a direction surrounding the axial direction is referred to as a "circumferential direction". The circumferential direction is a second direction along the intake port 12 and is a tangential direction orthogonal to the radial direction.

The cryopump 10 includes a cryocooler 16, a first-stage cryopanel 18, a second-stage cryopanel 20, and a cryopump housing 70. The first-stage cryopanel 18 may be referred to as a high-temperature cryopanel part or a 100 K part. The second-stage cryopanel 20 may be referred to as a low-temperature cryopanel part or a 10 K part.

The cryocooler 16 is a cryocooler such as a Gifford McMahon type cryocooler (a so-called GM cryocooler), for example. The cryocooler 16 is a two-stage cryocooler. Therefore, the cryocooler 16 includes a first cooling stage 22 and a second cooling stage 24. The cryocooler 16 is configured to cool the first cooling stage 22 to a first cooling temperature and cool the second cooling stage 24 to a second cooling temperature. The second cooling temperature is lower than the first cooling temperature. For example, the first cooling stage 22 is cooled to a temperature in a range of approximately 65 K to 120 K, preferably, in a range of 80 K to 100 K, and the second cooling stage 24 is cooled to a temperature in a range of approximately 10 K to 20 K.

Further, the cryocooler 16 includes a cryocooler structure part 21 that structurally supports the second cooling stage 24 on the first cooling stage 22 and structurally supports the first cooling stage 22 on a room temperature part 26 of the cryocooler 16. Therefore, the cryocooler structure part 21 includes a first cylinder 23 and a second cylinder 25 that extend coaxially along the radial direction. The first cylinder 23 connects the room temperature part 26 of the cryocooler 16 to the first cooling stage 22. The second cylinder 25 connects the first cooling stage 22 to the second cooling stage 24. The room temperature part 26, the first cylinder 23, the first cooling stage 22, the second cylinder 25, and the second cooling stage 24 are linearly arranged in this order.

A first displacer and a second displacer (not shown) are reciprocally disposed in the interiors of the first cylinder 23 and the second cylinder 25, respectively. A first regenerator and a second regenerator (not shown) are respectively incorporated into the first displacer and the second displacer. Further, the room temperature part 26 has a drive mechanism (although not shown in FIG. 1, for example, cryocooler motor 80) for reciprocating the first displacer and the second displacer. The drive mechanism includes a flow path switching mechanism that switches a flow path of a working gas (for example, helium) so as to periodically repeat the supply and discharge of the working gas to and from the interior of the cryocooler 16.

The first cooling stage 22 is installed at a first-stage low temperature end of the cryocooler 16. The first cooling stage 22 is a member that encloses the end part of the first cylinder 23 on the side opposite to the room temperature part 26 and surrounds a first expansion space of a working gas. The first expansion space is a variable volume formed inside the first cylinder 23 between the first cylinder 23 and the first displacer, and in which the volume changes with a reciprocating movement of the first displacer. The first cooling stage 22 is made of a metal material having a higher thermal conductivity than that of the first cylinder 23. For example, the first cooling stage 22 is made of copper and the first cylinder 23 is made of stainless steel.

The second cooling stage 24 is installed at a second-stage low temperature end of the cryocooler 16. The second cooling stage 24 is a member that encloses the end part of the second cylinder 25 on the side opposite to the room temperature part 26 and surrounds a second expansion space of the working gas. The second expansion space is a variable volume formed inside the second cylinder 25 between the second cylinder 25 and the second displacer, and in which the volume changes with a reciprocating movement of the second displacer. The second cooling stage 24 is made of a metal material having a higher thermal conductivity than that of the second cylinder 25. The second cooling stage 24 is made of copper and the second cylinder 25 is made of stainless steel.

The cryocooler 16 is connected to a compressor (not shown) for the working gas. The cryocooler 16 cools the first cooling stage 22 and the second cooling stage 24 by expanding the working gas pressurized by the compressor in the interior thereof. The expanded working gas is recovered to the compressor and pressurized again. The cryocooler 16 generates cold by repeating a thermodynamic cycle including the supply and discharge of the working gas and the reciprocating movements of the first displacer and the second displacer in synchronization with the supply and discharge of the working gas.

The cryopump 10 shown in the drawing is a so-called horizontal cryopump. The horizontal cryopump is generally a cryopump in which the cryocooler 16 is disposed so as to intersect (usually, be orthogonal to) the center axis C of the cryopump 10. The first cooling stage 22 and the second cooling stage 24 of the cryocooler 16 are arrayed in a direction perpendicular to the cryopump center axis C (horizontal in FIG. 1 and in the direction of the center axis D of the cryocooler 16).

The first-stage cryopanel 18 includes a radiation shield 30 and an inlet cryopanel 32 and surrounds the second-stage cryopanel 20. The first-stage cryopanel 18 is a cryopanel provided to protect the second-stage cryopanel 20 from radiant heat from outside the cryopump 10 or from the cryopump housing 70. The first-stage cryopanel 18 is thermally coupled to the first cooling stage 22. Accordingly, the first-stage cryopanel 18 is cooled to the first cooling temperature. The first-stage cryopanel 18 has a gap between the first-stage cryopanel 18 and the second-stage cryopanel 20, and the first-stage cryopanel 18 is not in contact with the second-stage cryopanel 20. The radiation shield 30 and the inlet cryopanel 32 may be formed of a metal material having a high thermal conductivity such as copper, and may be coated with a plating layer such as nickel or another coating layer.

The radiation shield 30 is provided to protect the second-stage cryopanel 20 from the radiant heat of the cryopump housing 70. The radiation shield 30 is located between the cryopump housing 70 and the second-stage cryopanel 20 and surrounds the second-stage cryopanel 20. The radiation shield 30 has a shield main opening 34 for receiving gas from the outside of the cryopump 10 into the internal space 14. The shield main opening 34 is located at the intake port 12.

The radiation shield 30 is provided with a shield front end 36 defining the shield main opening 34, a shield bottom portion 38 which is located on the side opposite to the shield main opening 34, and a shield side portion 40 connecting the shield front end 36 to the shield bottom portion 38. The shield front end 36 forms a part of the shield side portion 40. The shield side portion 40 extends in the axial direction from the shield front end 36 to the side opposite to the shield main opening 34, and extends so as to surround the second cooling stage 24 in the circumferential direction. The radiation shield 30 has a tubular shape (for example, a cylinder) in which the shield bottom portion 38 is closed, and is formed in a cup shape. An annular gap 42 is formed between the shield side portion 40 and the second-stage cryopanel 20.

The shield bottom portion 38 may be a member separate from the shield side portion 40. For example, the shield bottom portion 38 may be a flat disk having substantially the same diameter as the shield side portion 40, or may be attached to the shield side portion 40 on the side opposite to the shield main opening 34. Further, at least a part of the shield bottom portion 38 may be open. For example, the radiation shield 30 may not be closed by the shield bottom portion 38. That is, both ends of the shield side portion 40 may be open.

The shield side portion 40 has a shield side portion opening 44 into which the cryocooler structure part 21 is inserted. The second cooling stage 24 and the second cylinder 25 are inserted into the radiation shield 30 from outside the radiation shield 30 through the shield side portion opening 44. The shield side portion opening 44 is an attachment hole formed in the shield side portion 40 and is, for example, circular. The first cooling stage 22 is disposed outside the radiation shield 30.

The shield side portion 40 is provided with an attachment seat 46 for the cryocooler 16. The attachment seat 46 is a flat portion for attaching the first cooling stage 22 on the radiation shield 30, and is slightly depressed when viewed from outside the radiation shield 30. The attachment seat 46 forms the outer periphery of the shield side portion opening 44. The attachment seat 46 is closer to the shield bottom portion 38 than the shield front end 36 in the axial direction. The first cooling stage 22 is attached to the attachment seat 46, whereby the radiation shield 30 is thermally coupled to the first cooling stage 22.

The inlet cryopanel 32 is provided in the shield main opening 34 in order to protect the second-stage cryopanel 20 from radiant heat from an external heat source of the cryopump 10. The heat source outside the cryopump 10 is, for example, a heat source inside the vacuum chamber 90 to which the cryopump 10 is attached. The inlet cryopanel 32 can limit not only radiant heat but also the entry of gas molecules. The inlet cryopanel 32 occupies a part of the opening area of the shield main opening 34 so as to limit the gas inflow through the shield main opening 34 to a desired amount. An annular open area 48 is formed between the inlet cryopanel 32 and the shield front end 36.

The inlet cryopanel 32 is attached to the shield front end 36 by an appropriate attachment member and is thermally coupled to the radiation shield 30. The inlet cryopanel 32 is thermally coupled to the first cooling stage 22 via the radiation shield 30. The inlet cryopanel 32 has, for example, a plurality of annular or linear wing plates. Alternatively, the inlet cryopanel 32 may be a single plate-shaped member.

The second-stage cryopanel 20 is attached to the second cooling stage 24 so as to surround the second cooling stage 24. Therefore, the second-stage cryopanel 20 is thermally coupled to the second cooling stage 24, and the second-stage cryopanel 20 is cooled to the second cooling temperature. The second-stage cryopanel 20 is surrounded by the shield side portion 40 together with the second cooling stage 24.

The second-stage cryopanel 20 includes a top cryopanel 60 facing the shield main opening 34, a cryopanel member 62 disposed between the top cryopanel 60 and the shield bottom portion 38, and a cryopanel attachment member 64. The cryopanel members 62 are disposed on both sides of the second cooling stage 24 with the cryopump center axis C interposed therebetween. The cryopanel member 62 is disposed along a plane perpendicular to the cryopump center axis C. The top cryopanel 60 and the cryopanel member 62 are attached to the second cooling stage 24 via the cryopanel attachment member 64.

Since the annular gap 42 is formed between the top cryopanel 60, the cryopanel member 62, and the shield side portion 40, neither the top cryopanel 60 nor the cryopanel member 62 is in contact with the radiation shield 30. The cryopanel member 62 is covered by the top cryopanel 60.

The top cryopanel 60 is a part of the second-stage cryopanel 20 that is closest to the inlet cryopanel 32. The top cryopanel 60 is disposed between the shield main opening 34 or the inlet cryopanel 32 and the cryocooler 16 in the axial direction. The top cryopanel 60 is located at the center of the internal space 14 of the cryopump 10 in the axial direction. Therefore, a large accommodation space 65 for a condensed layer is formed between the front surface of the top cryopanel 60 and the inlet cryopanel 32. The accommodation space 65 for the condensed layer occupies the upper half of the internal space 14. The axial height of the accommodation space 65 may be in the range of ⅓ to ⅔ of the axial length of the radiation shield 30.

The top cryopanel 60 is a substantially flat cryopanel disposed vertically in the axial direction. That is, the top cryopanel 60 extends in the radial direction and the circumferential direction. The top cryopanel 60 is a disc-shaped panel having a size (for example, projected area) larger than that of the inlet cryopanel 32. However, the relationship between the dimensions of the top cryopanel 60 and the inlet cryopanel 32 is not limited thereto, and the top cryopanel 60 may be smaller or both may have substantially the same dimensions.

The top cryopanel 60 is disposed so as to form a gap area 66 between the top cryopanel 60 and the cryocooler structure part 21. The gap area 66 is a space formed in the axial direction between the rear surface of the top cryopanel 60 and the second cylinder 25. The top cryopanel 60 and the cryopanel member 62 are formed of a metal material having a high thermal conductivity such as copper, and may be coated with a plating layer such as nickel.

The cryopanel member 62 is provided with an adsorbent 74 such as activated carbon. The adsorbent 74 is adhered to, for example, the rear surface of the cryopanel member 62. It is intended that the front surface of the cryopanel member 62 functions as a condensing surface and the rear surface functions as an adsorption surface. The adsorbent 74 may be provided on the front surface of the cryopanel member 62. Similarly, the top cryopanel 60 may have an adsorbent 74 on the front surface and/or rear surface. Alternatively, the top cryopanel 60 may not include the adsorbent 74.

The cryopump 10 includes a gas flow adjusting member 50 configured to deflect the flow of gas flowing in from the shield main opening 34 from the cryocooler structure part 21. The gas flow adjusting member 50 is configured to deflect the gas flow flowing into the accommodation space 65 through the inlet cryopanel 32 or the open area 48 from the second cylinder 25. The gas flow adjusting member 50 may be a gas flow deflecting member or a gas flow reflecting member disposed above the cryocooler structure part 21 or the second cylinder 25 and adjacent thereto. The gas flow adjusting member 50 is locally provided at the same position as the shield side portion opening 44 in the circumferential direction. The gas flow adjusting member 50 has a rectangular shape when viewed from above. The gas flow adjusting member 50 is, for example, a single flat plate, and may be curved.

The gas flow adjusting member 50 extends from the shield side portion 40 and is inserted into the gap area 66. However, the gas flow adjusting member 50 is not in contact with the top cryopanel 60, the second cylinder 25, and other parts of the second cooling temperature surrounding the gap area 66. The gas flow adjusting member 50 is thermally coupled to the first cooling stage 22 via the radiation shield 30. Therefore, the gas flow adjusting member 50 is cooled to the first cooling temperature.

The cryopump housing 70 is a casing of the cryopump 10, which accommodates the first-stage cryopanel 18, the second-stage cryopanel 20, and the cryocooler 16, and is a vacuum chamber configured to maintain the vacuum tightness of the internal space 14. The cryopump housing 70 includes the first-stage cryopanel 18 and the cryocooler structure part 21 in a non-contact manner. The cryopump housing 70 is attached to the room temperature part 26 of the cryocooler 16.

The intake port 12 is defined by a front end of the cryopump housing 70. The cryopump housing 70 has an intake port flange 72 extending radially outward from a front end thereof. The intake port flange 72 is provided over the entire circumference of the cryopump housing 70. The cryopump 10 is attached to the vacuum chamber 90 using the intake port flange 72.

The cryopump housing 70 includes the cryopanel accommodation portion 76 that surrounds the radiation shield 30 in a non-contact manner with the radiation shield 30, and the cryocooler accommodation portion 77 that surrounds the first cylinder 23 of the cryocooler 16. The cryopanel accommodation portion 76 and the cryocooler accommodation portion 77 are integrally formed.

The cryopanel accommodation portion 76 has a cylindrical or dome-shaped shape in which the intake port flange 72 is formed at one end and the other end is closed as a housing bottom surface 70*a*. In addition to the intake port 12, an opening through which the cryocooler 16 is inserted is formed on the side wall of the cryopanel accommodation portion 76 that connects the intake port flange 72 to the housing bottom surface 70*a*. The cryocooler accommodation portion 77 has a cylindrical shape extending from this opening to the room temperature part 26 of the cryocooler 16. The cryocooler accommodation portion 77 connects the cryopanel accommodation portion 76 to the room temperature part 26 of the cryocooler 16.

When the cryopump 10 is operated, first, the interior of the vacuum chamber 90 is roughed to approximately 1 Pa with another appropriate roughing pump before the operation. Thereafter, the cryopump 10 is operated. The first cooling stage 22 and the second cooling stage 24 are respectively cooled to the first cooling temperature and the second cooling temperature by the driving of the cryocooler 16. Accordingly, the first-stage cryopanel 18 and the second-stage cryopanel 20 thermally coupled to these are also respectively cooled to the first cooling temperature and the second cooling temperature.

The inlet cryopanel 32 cools the gas flying from the vacuum chamber 90 toward the cryopump 10. A gas having a sufficiently low vapor pressure (for example, $10^{-8}$ Pa or less) at the first cooling temperature condenses on the surface of the inlet cryopanel 32. This gas may be referred to as a first type gas (also referred to as a type-I gas). The first type gas is, for example, water vapor. In this manner, the inlet cryopanel 32 can pump the first type gas. A part of the gas whose vapor pressure is not sufficiently low at the first cooling temperature passes through the inlet cryopanel 32 or the open area 48 and enters the accommodation space 65. Alternatively, the other part of the gas is reflected by the inlet cryopanel 32 and does not enter the accommodation space 65.

The gas entered the accommodation space 65 is cooled by the second-stage cryopanel 20. A gas having a sufficiently low vapor pressure (for example, $10^{-8}$ Pa or less) at the second cooling temperature condenses on the surface of the second-stage cryopanel 20. This gas may also be referred to as a second type gas (also referred to as a type-II gas). The second type gas is a gas that does not condense at the first cooling temperature. The second type gas is, for example, argon, nitrogen, and oxygen. In this manner, the second-stage cryopanel 20 can pump the second type gas. Since the second type gas directly faces the accommodation space 65, a condensed layer of the second type gas can grow significantly on the front surface of the top cryopanel 60. Since the cryopump 10 has a large accommodation space 65, a large amount of second type gas can be stored.

A gas in which vapor pressure is not sufficiently low at the second cooling temperature is adsorbed on the adsorbent 74 of the second-stage cryopanel 20. This gas may also be referred to as a third type gas (also referred to as a type-III gas). The third type gas is, for example, water vapor. In this manner, the second-stage cryopanel 20 can pump the third type gas. Therefore, the cryopump 10 can pump various gases by condensation or adsorption and can make the degree of vacuum of the vacuum chamber 90 reach a desired level.

As the pumping operation is continued, gas is accumulated in the cryopump 10. The cryopump 10 is regenerated in order to discharge the accumulated gas to the outside. When the regeneration is completed, the pumping operation can be started again.

In this manner, the cryopump 10 is configured to have the accommodation space 65 for the condensed layer of a gas (for example, second type gas). The first-stage cryopanel 18 is disposed so as to surround the accommodation space 65, and is cooled to a temperature higher than the condensation temperature of the second type gas. The second-stage cryopanel 20 is disposed so as to be surrounded by the inner surface of the first-stage cryopanel (for example, inner surface of the shield side portion 40) together with the accommodation space 65, and is cooled to a temperature equal to or lower than the condensation temperature of the second type gas. The condensed layer of the second type gas is deposited on the second-stage cryopanel 20 (for example, top cryopanel 60). The intake port 12 allows the passage of the first-stage heat load (for example, radiant heat) incident on the inner surface of the first-stage cryopanel from outside the cryopump 10 (that is, vacuum chamber 90) and the gas entering the accommodation space 65 from outside the cryopump 10.

Further, a gate valve 92 is installed between the cryopump 10 and the vacuum chamber 90. The gate valve 92 is disposed adjacent to the intake port 12. The intake port flange 72 is attached to one side of the gate valve 92, and the opening portion of the vacuum chamber 90 is attached to a side opposite to the gate valve 92. When the gate valve 92 is open, the first-stage heat load and the second type gas can enter the accommodation space 65 from the vacuum chamber 90 through the intake port 12. When the gate valve 92 is closed, the intake port 12 is closed. Therefore, the first-stage heat load and the second type gas do not enter the accommodation space 65. The gate valve 92 may be provided by a supplier other than the manufacturer of the cryopump 10, or may be provided by the manufacturer of the cryopump 10 together with the cryopump 10.

Further, a gate valve controller 94 that controls the gate valve 92 may be provided. The gate valve controller 94 is configured to control the opening and closing of the gate valve 92. The gate valve controller 94 may form a part of the control device of the vacuum process device having the vacuum chamber 90. The gate valve controller 94 may be communicably connected to a cryopump controller (hereinafter, also referred to as a CP controller) 100 that controls the cryopump 10. The gate valve controller 94 may be configured to output a signal indicating the open/closed state of the gate valve 92 (for example, gate valve closing signal G indicating that the gate valve 92 is closed) to the CP controller 100. The gate valve controller 94 may form a part of the cryopump controller (hereinafter, also referred to as a CP controller) 100 that controls the cryopump 10, or may be provided as a single unit.

Figure 2:
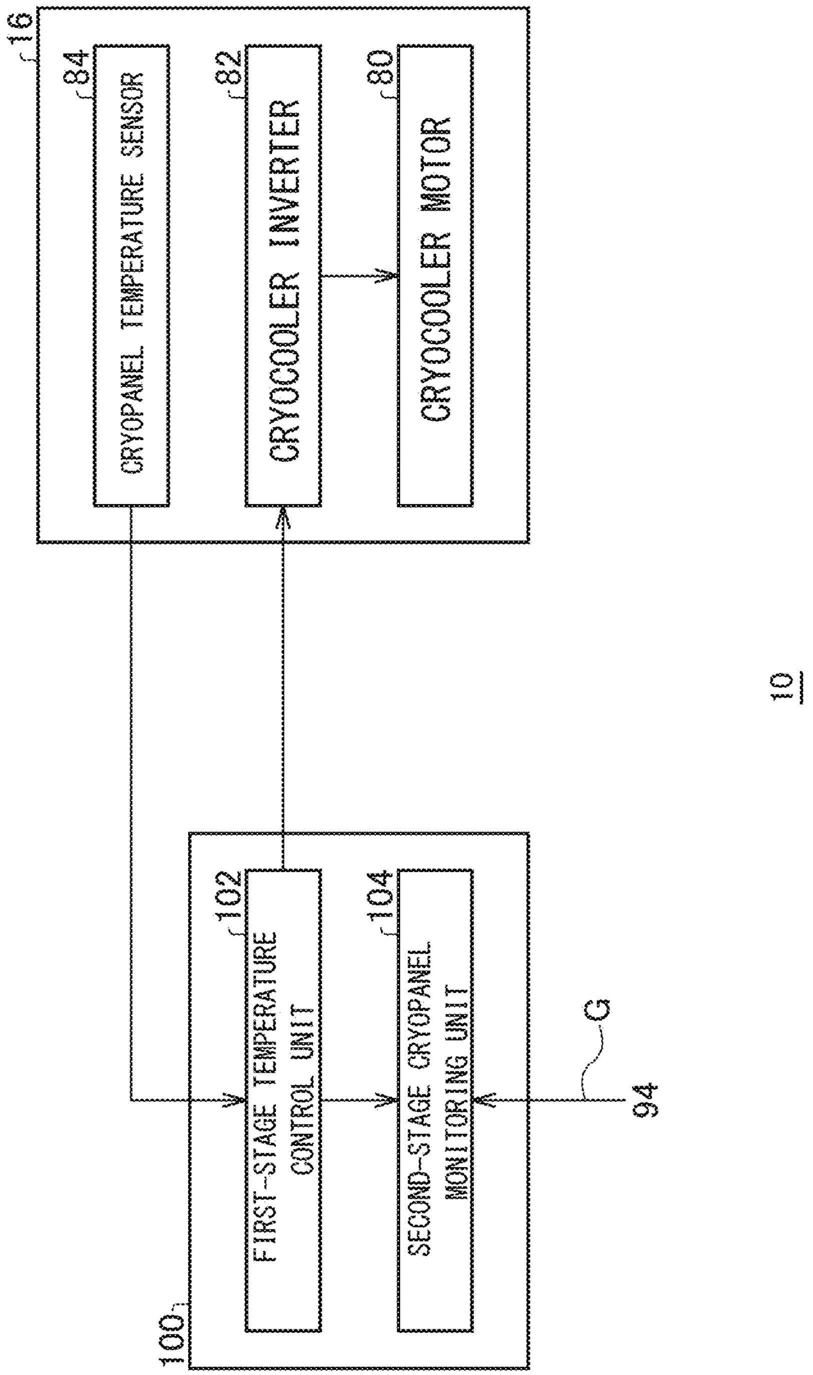
FIG. 2 is a control block diagram relating to the cryopump shown in FIG. 1.

FIG. 2 is a control block diagram relating to the cryopump 10 shown in FIG. 1.

Such a control configuration of the cryopump 10 is realized by elements and circuits such as a CPU and memory of the computer as a hardware configuration, is realized by a computer program or the like as a software configuration, and in FIG. 2, it is shown as a functional block realized by cooperation as appropriate. It is understood by those skilled in the art that these functional blocks can be realized in various forms by combining hardware and software.

The cryopump 10 includes the CP controller 100. The CP controller 100 includes a CPU that executes various arithmetic processes, a ROM that stores various control programs, a RAM that is used as a work area for data storage and program execution, an input/output interface, and a memory. Further, the CP controller 100 is configured to be able to communicate with a higher-level controller (not shown) for controlling the vacuum process device to which the cryopump 10 is attached.

The cryocooler 16 includes a cryocooler motor 80 as a drive source for driving the thermodynamic cycle of the cryocooler 16 and a cryocooler inverter 82 that controls the power of the specified voltage and frequency supplied from an external power source such as a commercial power source and supplies the power to the cryocooler motor 80. The cryocooler inverter 82 converts the input power from the external power source and outputs the input power to the cryocooler motor 80 according to the operating frequency of the cryocooler 16 controlled by the CP controller 100. In this manner, the cryocooler motor 80 is driven by the operating frequency determined by the CP controller 100 and output from the cryocooler inverter 82. The cryocooler motor 80 and the cryocooler inverter 82 may be attached to the room temperature part 26 shown in FIG. 1.

The operating frequency (also referred to as operating speed) of the cryocooler 16 represents the operating frequency or rotation speed of the cryocooler motor 80, the operating frequency of the cryocooler inverter 82, the frequency of the thermodynamic cycle of the cryocooler 16 (for example, refrigeration cycle such as GM cycle), or any of these frequencies. The frequency of the thermodynamic cycle is the number of times per unit time of the thermodynamic cycle performed in the cryocooler 16.

Further, the cryocooler 16 includes a cryopanel temperature sensor 84. The cryopanel temperature sensor 84 is attached to the first cooling stage 22 and measures the temperature of the first-stage cryopanel 18. The cryopanel temperature sensor 84 may be attached to the first-stage cryopanel 18. The cryopanel temperature sensor 84 is communicably connected to the CP controller 100 so as to periodically measure the temperature of the first-stage cryopanel 18 and output a signal indicating a measured temperature value to the CP controller 100.

The CP controller 100 includes a first-stage temperature control unit 102 that controls the operating frequency of the cryocooler 16 to cool the first-stage cryopanel 18 to the first-stage target temperature. The first-stage temperature control unit 102 is configured to determine the operating frequency of the cryocooler 16 (for example, by PID control) as a function of the deviation between the first-stage target temperature and a measured temperature of the first-stage cryopanel 18.

When the heat load on the first-stage cryopanel 18 increases, the temperature of the first-stage cryopanel 18 can increase. In a case where a measured temperature of the cryopanel temperature sensor 84 is higher than the first-stage target temperature, the first-stage temperature control unit 102 increases the operating frequency of the cryocooler 16. As a result, the frequency of the thermodynamic cycle in the cryocooler 16 is also increased (that is, the cooling capacity of the cryocooler 16 is increased), and the first-stage cryopanel 18 is cooled toward the first-stage target temperature. On the contrary, in a case where the measured temperature of the cryopanel temperature sensor 84 is lower than the target temperature, the operating frequency of the cryocooler 16 is reduced and the cooling capacity is lowered, and the first-stage cryopanel 18 is heated toward the first-stage target temperature. In this manner, the temperature of the first-stage cryopanel 18 can be kept in the temperature range near the first-stage target temperature. Since the operating frequency of the cryocooler 16 can be appropriately controlled according to the first-stage heat load, such control helps to reduce the power consumption of the cryopump 10.

Further, the CP controller 100 includes a second-stage cryopanel monitoring unit 104 that monitors the amount of condensed gas in the accommodation space 65 based on the change in the first-stage heat load. The second-stage cryopanel monitoring unit 104 may be configured to receive a signal (for example, gate valve closing signal G) indicating an open/closed state of the gate valve 92 from the gate valve controller 94. Details of the second-stage cryopanel monitoring unit 104 will be described later.

Figure 3A:
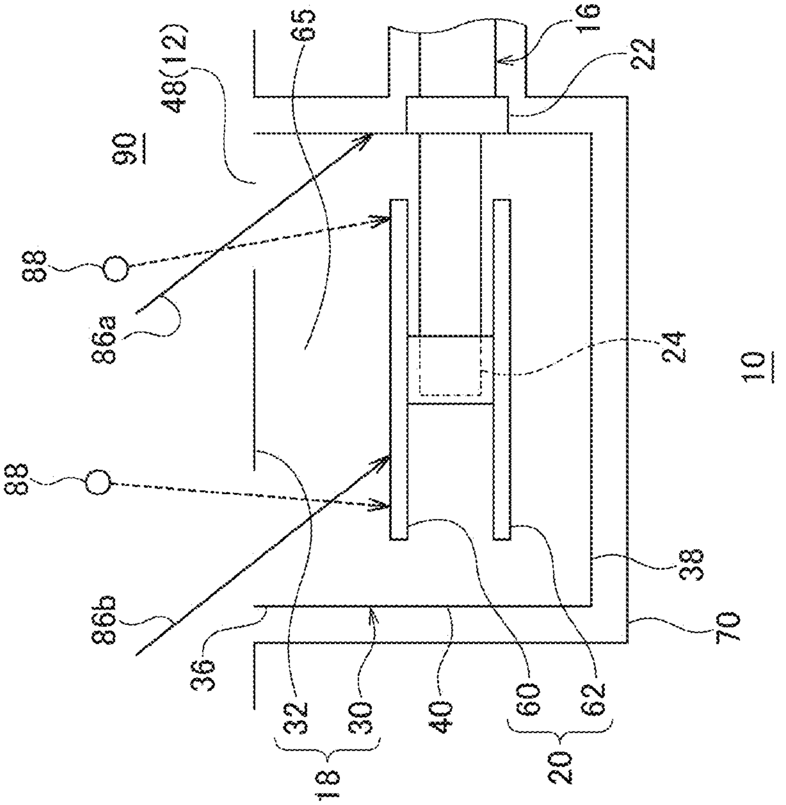
FIGS. 3A and 3B are diagrams for describing in principle a method of monitoring the cryopump according to an embodiment.
Figure 3B:
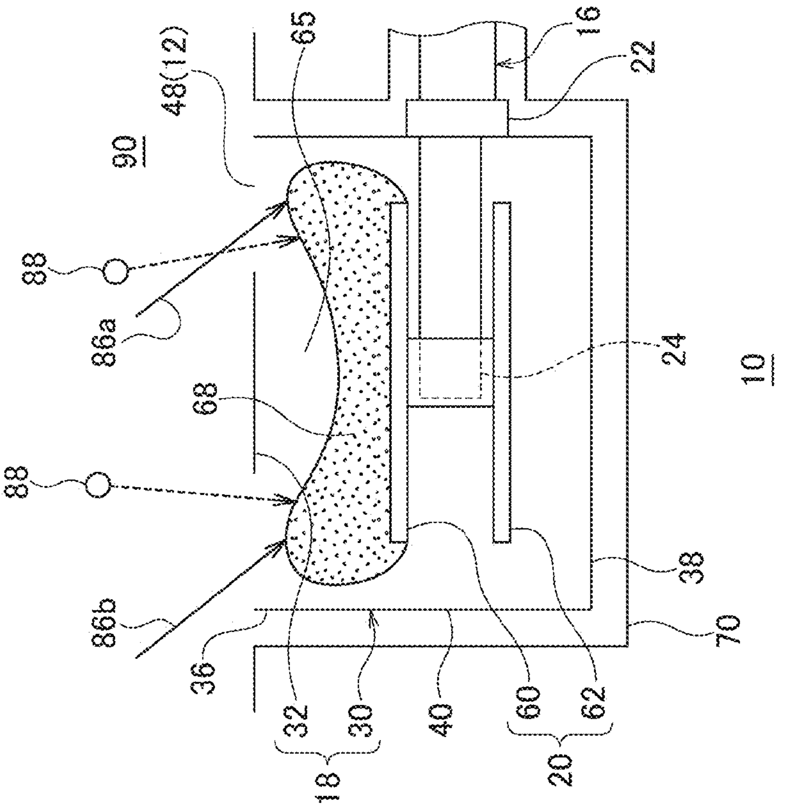

FIGS. 3A and 3B are diagrams for describing in principle a method of monitoring the cryopump 10 according to an embodiment. FIG. 3A shows an initial situation in which there is no condensed layer of the second type gas, and FIG. 3B shows a situation in which the condensed layer 68 of the second type gas grows on the top cryopanel 60 during the vacuum pumping operation of the cryopump 10. The condensed layer 68 is ice or frost of a gas such as a second type gas. The radiant heats 86*a* and 86*b* and the gas molecules 88 of the second type gas enter the accommodation space 65 from outside the cryopump 10 through the open area 48 of the intake port 12. The radiant heats 86*a* and 86*b* and the gas molecules 88 of the second type gas enter from the vacuum chamber 90 into the cryopump 10 along a linear path. The approach angle can be determined depending on the design of the vacuum chamber 90, including the location of the heat source and gas inlet in the vacuum chamber 90. For convenience, the exemplary incident paths of the radiant heats 86*a* and 86*b* are shown by solid arrows, and the exemplary incident paths of the gas molecules 88 of the second type gas are shown by dashed arrows.

As shown in FIG. 3A, a part of the radiant heat 86*a* is incident on the inner surface of the first-stage cryopanel, for example, the inner surface of the radiation shield 30, and is the first-stage heat load. In the drawing, the radiant heat 86*a* is incident on the inner peripheral surface of the shield side portion 40, and depending on the incident angle of the radiant heat 86*a*, the radiant heat 86*a* can also be incident on the inner peripheral surface of the shield front end 36 or the upper surface of the shield bottom portion 38. A part of the other radiant heat 86*b* is incident on the upper surface of the second-stage cryopanel 20, for example, the top cryopanel 60, and is a second-stage heat load. As described above, the first-stage heat load is removed by the first cooling stage 22 of the cryocooler 16, and the second-stage heat load is removed by the second cooling stage 24 of the cryocooler 16.

Since the second type gas is cooled and condensed by the second-stage cryopanel 20, the gas molecules 88 of the second type gas are deposited on the top cryopanel 60 as the condensed layer 68 of the second type gas, as shown in FIG. 3B. The condensed layer 68 can also be deposited on the cryopanel member 62, and is not shown here. Since the inlet cryopanel 32 is disposed at the center of the intake port 12 and the open area 48 is formed around the inlet cryopanel 32, the growth rate of the condensed layer 68 and the resulting thickness (axial height) of the condensed layer 68 increases at the outer edge and is decreased at the center. Therefore, as shown in the drawing, the condensed layer 68 has a shape that rises below the open area 48 and has a recess below the inlet cryopanel 32.

As the condensed layer 68 grows further, the condensed layer 68 eventually comes into contact with any part of the first-stage cryopanel 18 (for example, shield front end 36, shield side portion 40, and/or inlet cryopanel 32). Since the cooling temperature of the first-stage cryopanel 18 is higher than the condensation temperature of the second type gas and the first-stage cryopanel 18 cannot condense the second type gas, the condensed layer 68 is again vaporized at the contact part with the first-stage cryopanel 18. The second type gas stored in the cryopump 10 as the condensed layer 68 is discharged again, and thereafter the cryopump 10 cannot provide the pumping function of the second type gas. That is, the cryopump 10 reaches a storage limit at the time of contact between the first-stage cryopanel 18 and the condensed layer 68.

When the cryopump housing 70 is provided with a viewport or other peephole, the worker can predict whether or not the storage limit is reached soon by visually observing the condensed layer 68 from outside the cryopump 10 through the peephole. However, in general, existing cryopumps 10 do not have such a peephole. The condensed layer 68 cannot be visually observed during the vacuum pumping operation of the cryopump 10. As another method, an attempt is made to know the time when the storage limit is reached from the cumulative amount of the second type gas introduced into the vacuum chamber 90. However, the storage limit depends on a specific shape of the condensed layer 68 because the storage limit depends on the physical contact between the first-stage cryopanel 18 and the condensed layer 68. Therefore, it is difficult to accurately predict the time when the storage limit is reached only from the cumulative introduction amount of the second type gas into the vacuum chamber 90.

Therefore, in this document, a new technique is proposed for predicting in real time that the amount of the second type gas stored in the cryopump 10 is approaching the storage limit during the vacuum pumping operation of the cryopump 10. In the embodiment, the amount of condensed gas in the accommodation space 65 is monitored based on the change in the first-stage heat load.

This concept is based on the fact that a ratio of the first-stage heat load to the second-stage heat load incident on the cryopump 10 through the intake port 12 changes according to the volume and/or shape of the condensed layer 68. When the volume and/or shape of the condensed layer 68 changes, the first-stage heat load and the second-stage heat load change, respectively, and the cooling balance of the first-stage cryopanel 18 and the second-stage cryopanel 20 by the cryocooler 16 changes. Therefore, by measuring the change in the first-stage heat load, it is possible to acquire information indicating the change in the volume and/or shape of the condensed layer 68.

As described above with reference to FIG. 3A, in the absence of the condensed layer 68, a part of the radiant heat 86*a* is the first-stage heat load and a part of the other radiant heat 86*b* is the second-stage heat load. When the condensed layer 68 grows, both the radiant heats 86*a* and 86*b* can enter the condensed layer 68 as shown in FIG. 3B. The condensed layer 68 serves as a so-called wall that shields the radiant heat 86*a* toward the inner surface of the first-stage cryopanel. Since the condensed layer 68 is deposited on the top cryopanel 60, the radiant heats 86*a* and 86*b* incident on the condensed layer 68 serve as the second-stage heat load.

As described above, as the height of the condensed layer 68 in the axial direction increases as the condensed layer 68 grows, the first-stage heat load tends to decrease and the second-stage heat load tends to increase. It can be said that the amount of the second type gas stored in the condensed layer 68 correlates with the first-stage heat load (or the second-stage heat load).

Therefore, in a case where the first-stage heat load is decreased, it may be determined that the amount of condensed gas in the accommodation space 65 is increased. Further, in a case where the first-stage heat load increases (since the amount of condensed gas gradually increases during the vacuum pumping operation of the cryopump 10, although such a situation is unlikely to occur), it can be determined that the amount of condensed gas in the accommodation space 65 is decreased. In this manner, the amount of condensed gas in the accommodation space 65 can be monitored based on the change in the first-stage heat load.

The change in the first-stage heat load can be measured as a change in at least one operating parameter of the cryocooler 16. In the cryopump 10 in which the operating frequency of the cryocooler 16 is controlled so as to cool the first-stage cryopanel 18 to the first-stage target temperature, the change in the first-stage heat load can be measured as a change in the operating frequency of the cryocooler 16.

Figure 4:
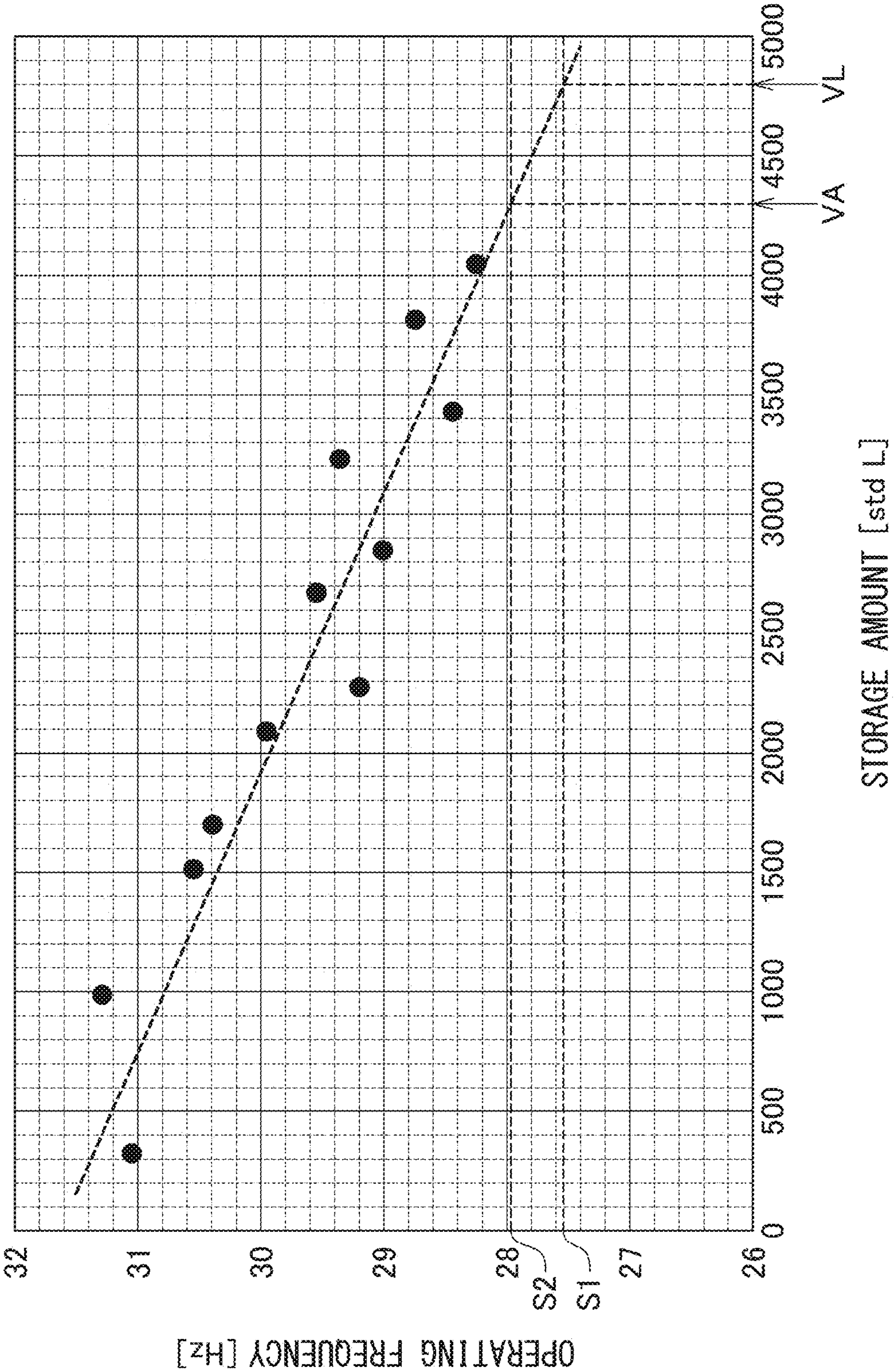
FIG. 4 is a graph showing a change in an operating frequency of a cryocooler during a vacuum pumping operation of the cryopump.

FIG. 4 shows a change in an operating frequency of the cryocooler 16 during a vacuum pumping operation of the cryopump 10. In FIG. 4, a vertical axis represents the operating frequency [Hz] of the cryocooler 16 and a horizontal axis represents the amount [std L] of the second type gas (argon gas) supplied to the vacuum chamber 90, which corresponds to the amount of the second type gas (also referred to as the storage amount) condensed in the condensed layer 68 shown in FIG. 3B.

As shown in FIG. 4, the operating frequency of the cryocooler 16 tends to decrease as the storage amount increases. As the storage amount increases and the condensed layer 68 grows, the first-stage heat load is decreased as described above. When the first-stage heat load is reduced, the temperature of the first-stage cryopanel 18 detected by the cryopanel temperature sensor 84 can be lowered. However, since the temperature of the first-stage cryopanel 18 is controlled to the first-stage target temperature, the operating frequency of the cryocooler 16 is actually reduced, the cooling capacity of the cryocooler 16 is lowered, and the first-stage cryopanel 18 is held at the first-stage target temperature. Although illustrated are the test results by the present inventor for the cryopump 10 having a specific design, it is confirmed that various cryopumps 10 also have the same tendency.

The vertical axis of FIG. 4 shows a first threshold value S1 and a second threshold value S2, and the horizontal axis shows a design storage limit value VL. The first threshold value S1 corresponds to the operating frequency of the cryocooler 16 that can be taken when the storage amount of the second type gas by the cryopump 10 reaches the design storage limit value VL. The second threshold value S2 corresponds to the operating frequency of the cryocooler 16 that can be taken when the storage amount of the second type gas by the cryopump 10 reaches an allowable storage amount VA. Here, the allowable storage amount VA is a value obtained by subtracting a predetermined margin from the design storage limit value VL. The margin may be as large as, for example, within 20%, or within 10%, or within 5% of the design storage limit value VL, or may be larger than, for example, 1% of the design storage limit value VL. The first threshold value S1 and the second threshold value S2 can be appropriately determined experimentally or empirically.

Therefore, in a case where the operating frequency of the cryocooler 16 is reduced to the first threshold value S1 or the second threshold value S2 during the vacuum pumping operation of the cryopump 10, it can be considered that the storage amount of the second type gas is approaching the storage limit. The operating frequency of the cryocooler 16 can be used as an index showing the storage amount of second type gas, that is, the amount of condensed gas in the accommodation space 65 in real time. As described above, by monitoring the operating frequency of the cryocooler 16, it is possible to predict in real time that the storage amount of the second type gas is approaching the storage limit during the vacuum pumping operation of the cryopump 10.

Figure 5:
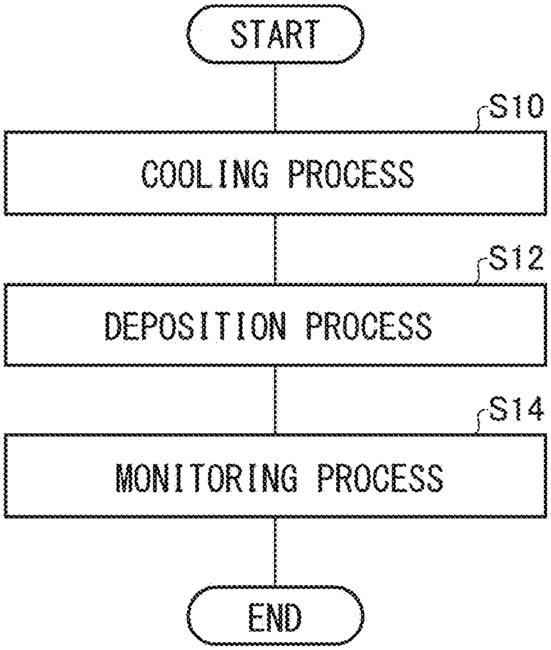
FIG. 5 is a flowchart showing a method of monitoring the cryopump according to an embodiment.

FIG. 5 is a flowchart showing a method of monitoring the cryopump 10 according to an embodiment. This method includes a cooling process (S10), a deposition process (S12), and a monitoring process (S14).

The cooling process (S10) includes cooling the first-stage cryopanel 18 to a temperature higher than the condensation temperature of the second type gas, and cooling the second-stage cryopanel 20 to a temperature equal to or lower than the condensation temperature of the second type gas. For example, the cooling process (S10) includes controlling the operating frequency of the cryocooler 16 to cool the first-stage cryopanel 18 to the first-stage target temperature by the first-stage temperature control unit 102 of the CP controller 100.

As shown in FIG. 3B, the deposition process (S12) includes depositing the condensed layer 68 of the second type gas that enters the accommodation space 65 from outside the cryopump 10 through the intake port 12 on the second-stage cryopanel 20.

The monitoring process (S14) includes monitoring the amount of condensed gas in the accommodation space 65, based on the change in the first-stage heat load incident on the inner surface of the first-stage cryopanel 18 from outside the cryopump 10 through the intake port 12. As described above, the amount of condensed gas in the accommodation space 65 mainly corresponds to the amount of the second type gas captured in the condensed layer 68 condensed on the top cryopanel 60.

For example, the monitoring process (S14) includes determining that the amount of condensed gas is increased in a case where the first-stage heat load is reduced by the second-stage cryopanel monitoring unit 104 of the CP controller 100 (for example, in a case where the operating frequency of the cryocooler 16 is reduced). Further, the second-stage cryopanel monitoring unit 104 may determine that the amount of condensed gas is decreased in a case where the first-stage heat load increases (for example, in a case where the operating frequency of the cryocooler 16 increases).

Figure 6:
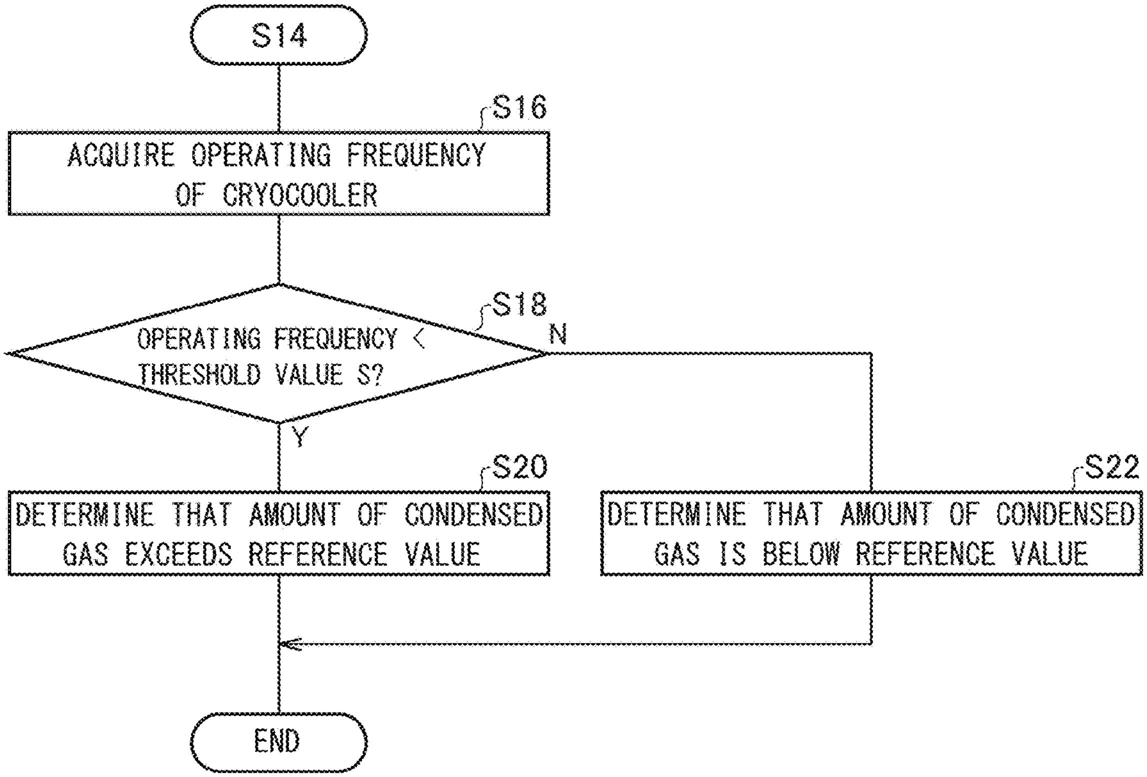
FIG. 6 is a flowchart showing a monitoring process shown in FIG. 5 in more detail.

FIG. 6 is a flowchart showing the monitoring process (S14) shown in FIG. 5 in more detail. First, the second-stage cryopanel monitoring unit 104 acquires the operating frequency of the cryocooler 16 from the first-stage temperature control unit 102 (S16).

The operating frequency of the cryocooler 16 may change as the amount of heat input from the vacuum chamber 90 to the cryopump 10 through the intake port 12 changes. The amount of heat input from the vacuum chamber 90 may depend, for example, on the vacuum process performed in the vacuum chamber 90. Such a change in thermal conditions in the vacuum chamber 90 may lead to an error in estimating the amount of condensed gas based on the operating frequency of the cryocooler 16. Therefore, it is preferable that the second-stage cryopanel monitoring unit 104 acquires the operating frequency of the cryocooler 16 at the timing when the radiant heat incident on the intake port 12 from outside the cryopump 10 is a default value. In this manner, the influence of changes in thermal conditions in the vacuum chamber 90 can be reduced or prevented.

The timing may be set, for example, during the closure of the gate valve 92. Therefore, the second-stage cryopanel monitoring unit 104 may acquire the operating frequency of the cryocooler 16 in response to the gate valve closing signal G. By closing the gate valve 92, the intake port 12 is closed, and the internal space 14 of the cryopump 10 is isolated from the vacuum chamber 90. Therefore, the heat input from the vacuum chamber 90 to the cryopump 10 through the intake port 12 is restricted or substantially blocked. By thermally separating the vacuum chamber 90 from the cryopump 10 in this manner, the second-stage cryopanel monitoring unit 104 can acquire the operating frequency of the cryocooler 16 in which the influence of the change in the thermal conditions in the vacuum chamber 90 is reduced or prevented.

The second-stage cryopanel monitoring unit 104 may acquire the operating frequency of the cryocooler 16 or other operating parameters from the first-stage temperature control unit 102 when the operation state of the cryocooler 16 is stabilized. For example, the second-stage cryopanel monitoring unit 104 may acquire the operating frequency of the cryocooler 16 when a predetermined time is elapsed from the reception of the gate valve closing signal G or other above timing. Alternatively, the second-stage cryopanel monitoring unit 104 may acquire the operating frequency of the cryocooler 16 when the rate of change of the operating frequency of the cryocooler 16 falls within a predetermined threshold value after the above timing. In this manner, it is possible to avoid acquiring the operating frequency of the cryocooler 16 in a transient state such as immediately after the gate valve 92 is closed.

Subsequently, the second-stage cryopanel monitoring unit 104 compares the acquired operating frequency of the cryocooler 16 with the threshold value S (S18). The threshold value S may be either the first threshold value S1 or the second threshold value S2 shown in FIG. 4.

In a case where the operating frequency of the cryocooler 16 is below the threshold value S (Y in S18), the second-stage cryopanel monitoring unit 104 may determine that the amount of condensed gas exceeds the reference value (S20). In a case where the threshold value S is the first threshold value S1, the reference value corresponds to the design storage limit value VL. In a case where the threshold value S is the second threshold value S2, the reference value corresponds to the allowable storage amount VA. The second-stage cryopanel monitoring unit 104 may be configured to output that the amount of condensed gas exceeds the reference value. For example, the second-stage cryopanel monitoring unit 104 may be configured to indicate to the worker in the form of an image, sound, or other appropriate form that the amount of condensed gas exceeds the reference value.

In a case where the operating frequency of the cryocooler 16 exceeds the threshold value S (N in S18), the second-stage cryopanel monitoring unit 104 determines that the amount of condensed gas is below the reference value (S22). Similarly, the second-stage cryopanel monitoring unit 104 may be configured to output that the amount of condensed gas is below the reference value.

In this manner, the monitoring process (S14) is ended. The monitoring process (S14) may be repeated each time the gate valve 92 is allowed to be closed, periodically, or at any other appropriate frequency.

Figure 7:
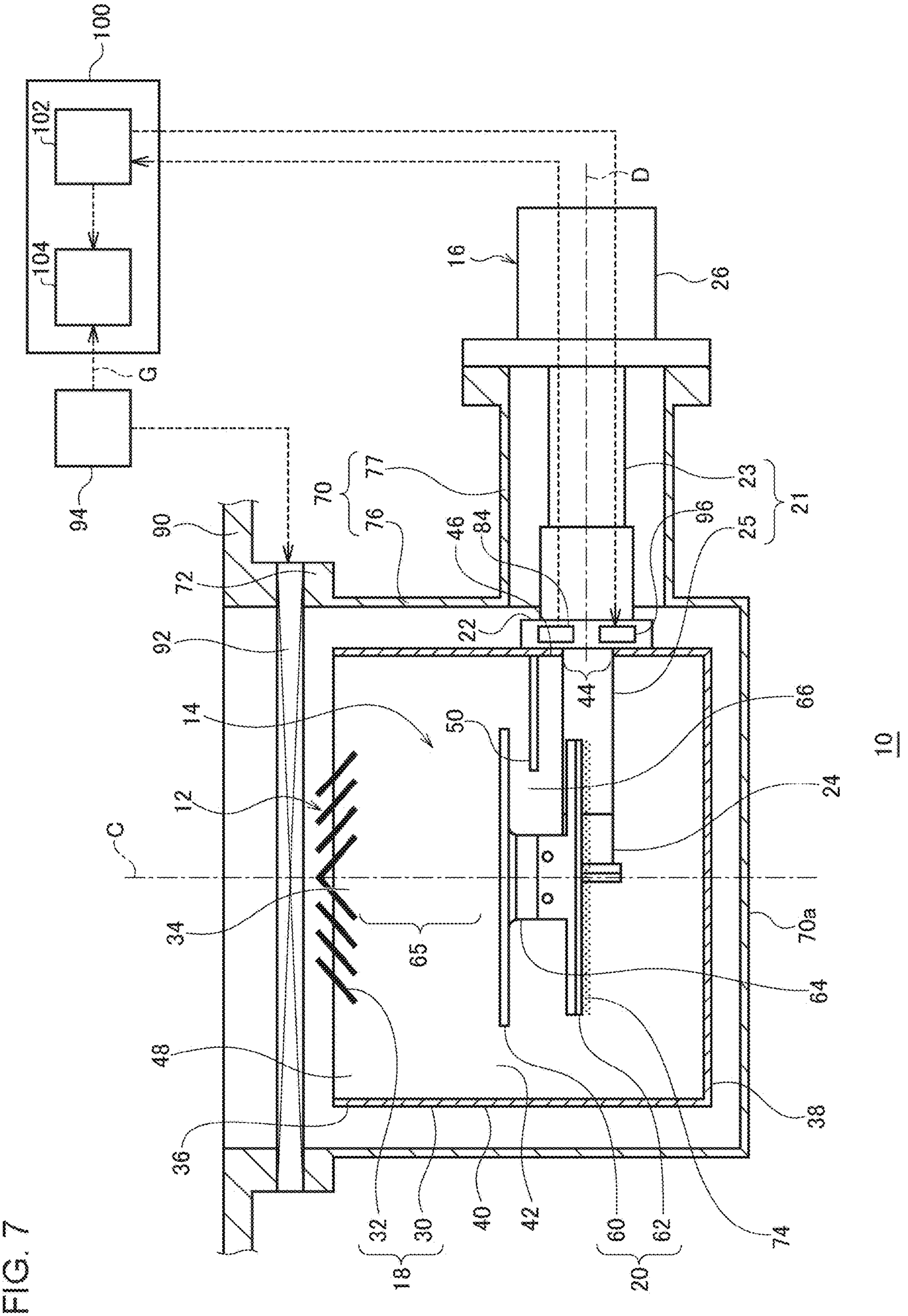
FIG. 7 is a diagram schematically showing a cryopump according to an embodiment.

FIG. 7 is a diagram schematically showing a cryopump 10 according to an embodiment. As shown, the cryocooler 16 may include a variable output heater 96 for heating the first cooling stage 22, such as an electric heater. The heater 96 may be attached to the first cooling stage 22. Alternatively, the heater 96 may be attached to any part of the first-stage cryopanel 18.

In this case, the first-stage temperature control unit 102 may controls the output of the heater 96 (for example, the voltage and/or current supplied to the heater 96) to cool the first-stage cryopanel 18 to the first-stage target temperature. The first-stage temperature control unit 102 may be configured to determine the output of the heater 96 (for example, by PID control) as a function of the deviation between the first-stage target temperature and the measured temperature of the first-stage cryopanel 18.

When the heat load on the first-stage cryopanel 18 increases, the temperature of the first-stage cryopanel 18 can increase. In a case where the measured temperature of the cryopanel temperature sensor 84 is higher than the first-stage target temperature, the first-stage temperature control unit 102 reduces the output of the heater 96. As a result, the first-stage cryopanel 18 is cooled toward the first-stage target temperature. On the contrary, in a case where the measured temperature of the cryopanel temperature sensor 84 is lower than the target temperature, the first-stage temperature control unit 102 increases the output of the heater 96. As a result, the first-stage cryopanel 18 is heated toward the first-stage target temperature. In this manner, the temperature of the first-stage cryopanel 18 can be kept in the temperature range near the first-stage target temperature.

The second-stage cryopanel monitoring unit 104 monitors the amount of condensed gas in the accommodation space 65 based on the change in the first-stage heat load, and more specifically, it may be determined that the amount of condensed gas in the accommodation space 65 is increased when the first-stage heat load is decreased. Therefore, the second-stage cryopanel monitoring unit 104 may be configured to acquire the output of the heater 96 from the first-stage temperature control unit 102 and compare the output of the heater 96 with the threshold value. The second-stage cryopanel monitoring unit 104 may determine that the amount of condensed gas exceeds the reference value in a case where the output of the heater 96 exceeds the threshold value. The second-stage cryopanel monitoring unit 104 may determine that the amount of condensed gas falls below the reference value in a case where the output of the heater 96 does not reach the threshold value.

The second-stage cryopanel monitoring unit 104 may acquire the output of the heater 96 from the first-stage temperature control unit 102 at the timing when the radiant heat incident on the intake port 12 from outside the cryopump 10 is a default value. The timing may be set while the gate valve 92 is closed.

As described above, in the cryopump 10 according to the embodiment, the amount of condensed gas in the accommodation space 65 is monitored based on the change in the first-stage heat load. Since the change in the first-stage heat load reflects the change in the shape of the condensed layer 68, compared with the existing attempt to predict the arrival of the storage limit only from the cumulative amount of the second type gas introduced into the vacuum chamber 90, the amount of condensed gas in the cryopump 10 can be estimated more accurately. It can be predicted during use of the cryopump that the amount of gas stored in the cryopump 10 is approaching the storage limit.

More specifically, the change in the first-stage heat load is measured as the change in the operating parameter of the cryocooler 16 such as the operating frequency of the cryocooler 16 or the heater output, and the amount of condensed gas in the accommodation space 65 is monitored based on the measured change in the operating parameter. In this manner, it is possible to predict in real time that the storage amount of the second type gas is approaching the storage limit during the vacuum pumping operation of the cryopump 10.

The cryopump 10 can be continued to be used until the storage amount approaches the storage limit as compared with the related art, and a regeneration interval (period from the previous regeneration to the next regeneration) of the cryopump 10 can be lengthened. It is easier to adapt a regeneration schedule of the cryopump 10 to the production plan in the vacuum process device so as to improve a throughput of the vacuum process device to which the cryopump 10 is attached.

The present invention has been described above based on the examples. It will be understood by those skilled in the art that the present invention is not limited to the embodiments described above, various design changes can be made, various modification examples can be made, and such modification examples are also within the scope of the present invention.

Figure 8:
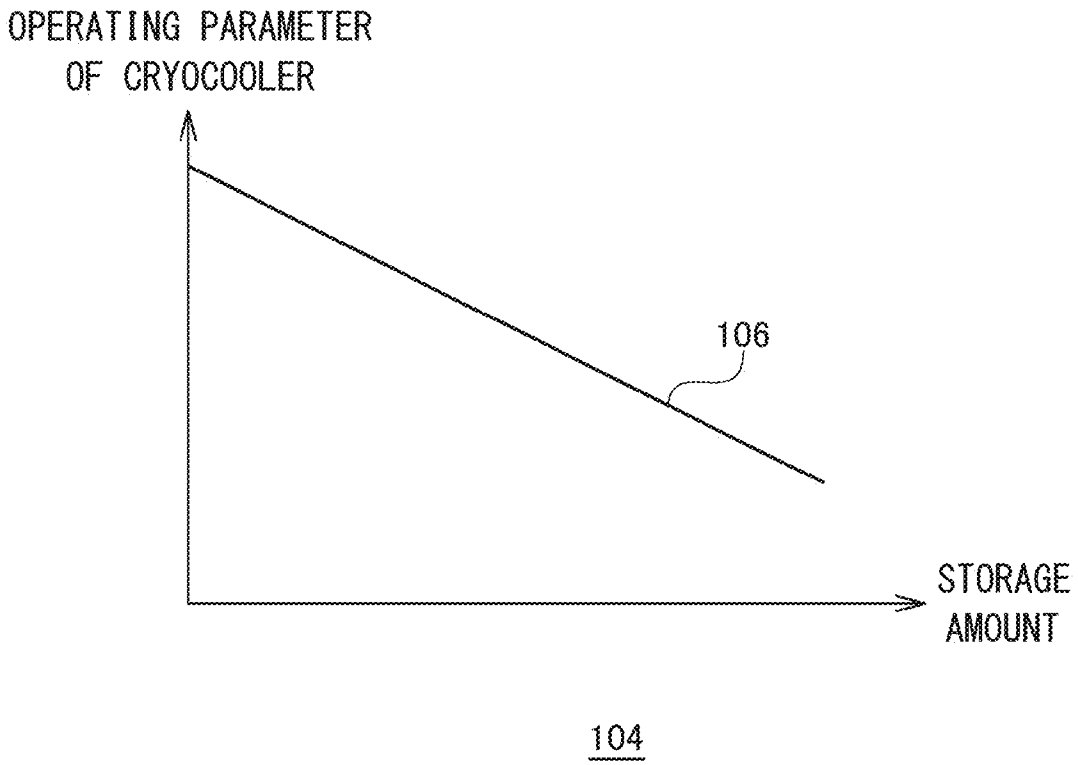
FIG. 8 is a graph schematically showing an example of a condensed gas amount table according to an embodiment.

In one embodiment, as shown in FIG. 8, the second-stage cryopanel monitoring unit 104 may include a condensed gas amount table 106 in which a plurality of values of the amount of condensed gas are associated with the value of the operating parameter of the cryocooler 16 (for example, operating frequency or output of the heater 96). The condensed gas amount table 106 may have a look-up table, a function, or any other form. The second-stage cryopanel monitoring unit 104 may acquire the operating parameter of the cryocooler 16 from the first-stage temperature control unit 102. The second-stage cryopanel monitoring unit 104 may calculate an estimated value of the amount of condensed gas from the operating parameter of the cryocooler 16 and the condensed gas amount table 106. The second-stage cryopanel monitoring unit 104 may be configured to output the calculated estimated value of the amount of condensed gas in an image, sound, or other appropriate form. In this manner, the cryopump 10 can estimate the amount of condensed gas in real time.

In the above description, the horizontal cryopump has been exemplified. However, the present invention is also applicable to other vertical cryopumps. The vertical cryopump refers to a cryopump in which the cryocooler 16 is disposed along the center axis C of the cryopump 10. Further, the internal configuration of the cryopump, such as the arrangement, the shape, the number, or the like of a cryopanel, is not limited to the specific embodiment described above. Various known configurations can be appropriately adopted.

INDUSTRIAL APPLICABILITY

An embodiment of the present invention can be used in the field of the cryopump and the method of monitoring the cryopump.

It should be understood that the invention is not limited to the above-described embodiment, but may be modified into various forms on the basis of the spirit of the invention. Additionally, the modifications are included in the scope of the invention.

What is claimed is:

1. A cryopump including an accommodation space for a condensed layer of gas, the cryopump comprising:

a first-stage cryopanel that is cooled to a temperature higher than a condensation temperature of the gas and includes an inner surface of the first-stage cryopanel disposed so as to surround the accommodation space;

a second-stage cryopanel that is cooled to a temperature equal to or lower than the condensation temperature of the gas, on which the condensed layer of the gas is deposited, and that is disposed so as to be surrounded by the inner surface of the first-stage cryopanel together with the accommodation space;

a cryopump intake port that allows a passage of a first-stage heat load incident on the inner surface of the first-stage cryopanel from outside the cryopump and the gas entering the accommodation space from outside the cryopump;

a second-stage cryopanel monitor that monitors an amount of condensed gas in the accommodation space based on a change in the first-stage heat load;

a cryocooler including a first cooling stage thermally coupled to the first-stage cryopanel and a second cooling stage thermally coupled to the second-stage cryopanel; and a first-stage temperature controller that controls an operating parameter of the cryocooler to cool the first-stage cryopanel to a first-stage target temperature, wherein the second-stage cryopanel monitor acquires the operating parameter of the cryocooler from the first-stage temperature controller, and determines whether or not the amount of condensed gas exceeds a reference value by comparing the operating parameter of the cryocooler with a threshold value.

2. The cryopump according to claim 1, wherein the second-stage cryopanel monitor determines that the amount of condensed gas is increased in a case where the first-stage heat load is decreased.

3. A cryopump including an accommodation space for a condensed layer of gas, the cryopump comprising:

a first-stage cryopanel that is cooled to a temperature higher than a condensation temperature of the gas and includes an inner surface of the first-stage cryopanel disposed so as to surround the accommodation space;

a second-stage cryopanel that is cooled to a temperature equal to or lower than the condensation temperature of the gas, on which the condensed layer of the gas is deposited, and that is disposed so as to be surrounded by the inner surface of the first-stage cryopanel together with the accommodation space;

a cryopump intake port that allows a passage of a first-stage heat load incident on the inner surface of the first-stage cryopanel from outside the cryopump and the gas entering the accommodation space from outside the cryopump;

a second-stage cryopanel monitor that monitors an amount of condensed gas in the accommodation space based on a change in the first-stage heat load;

a cryocooler including a first cooling stage thermally coupled to the first-stage cryopanel and a second cooling stage thermally coupled to the second-stage cryopanel; and a first-stage temperature controller that controls an operating frequency of the cryocooler to cool the first-stage cryopanel to a first-stage target temperature, wherein the second-stage cryopanel monitor compares the operating frequency of the cryocooler with a threshold value, and determines that the amount of condensed gas exceeds a reference value in a case where the operating frequency of the cryocooler falls below the threshold value.

4. The cryopump according to claim 3, wherein the second-stage cryopanel monitor acquires the operating frequency of the cryocooler at a timing when a radiant heat incident on the cryopump intake port from outside the cryopump is a default value, and compares the acquired operating frequency of the cryocooler with the threshold value.

5. The cryopump according to claim 4, wherein a gate valve that closes the cryopump intake port is provided, and the timing is set during a closure of the gate valve.

6. The cryopump according to claim 3, further comprising:

a condensed gas amount table in which each of a plurality of values of the amount of condensed gas is associated with a value of the operating frequency of the cryocooler, wherein the second-stage cryopanel monitor calculates an estimated value of the amount of condensed gas from the operating frequency of the cryocooler and the condensed gas amount table.

7. The cryopump according to claim 1, wherein the second-stage cryopanel monitor acquires the operating parameter of the cryocooler at a timing when a radiant heat incident on the cryopump intake port from outside the cryopump is a default value, and compares the acquired operating parameter of the cryocooler with the threshold value.

8. The cryopump according to claim 1, further comprising:

a condensed gas amount table in which each of a plurality of values of the amount of condensed gas is associated with a value of the operating parameter of the cryocooler, wherein the second-stage cryopanel monitor calculates an estimated value of the amount of condensed gas from the operating parameter of the cryocooler and the condensed gas amount table.

9. The cryopump according to claim 1, wherein the first-stage cryopanel is cooled to a first cooling temperature, and the second-stage cryopanel is cooled to a second cooling temperature lower than the first cooling temperature, and the gas is a type-II gas that does not condense at the first cooling temperature and condenses at the second cooling temperature.

10. A cryopump including an accommodation space for a condensed layer of gas, the cryopump comprising:

a first-stage cryopanel that is cooled to a temperature higher than a condensation temperature of the gas and includes an inner surface of the first-stage cryopanel disposed so as to surround the accommodation space;

a second-stage cryopanel that is cooled to a temperature equal to or lower than the condensation temperature of the gas, on which the condensed layer of the gas is deposited, and that is disposed so as to be surrounded by the inner surface of the first-stage cryopanel together with the accommodation space;

a cryopump intake port that allows a passage of a first-stage heat load incident on the inner surface of the first-stage cryopanel from outside the cryopump and the gas entering the accommodation space from outside the cryopump;

a second-stage cryopanel monitor that monitors an amount of condensed gas in the accommodation space based on a change in the first-stage heat load;

a cryocooler including a first cooling stage thermally coupled to the first-stage cryopanel, a heater that heats the first cooling stage, and a second cooling stage thermally coupled to the second-stage cryopanel; and a first-stage temperature controller control unit that controls an output of the heater to cool the first-stage cryopanel to a first-stage target temperature, wherein the second-stage cryopanel monitor compares the output of the heater with a threshold value, and determines that the amount of condensed gas exceeds a reference value in a case where the output of the heater exceeds the threshold value.

11. A method of monitoring a cryopump including a first-stage cryopanel having an inner surface of the first-stage cryopanel disposed so as to surround an accommodation space for a condensed layer of gas, a second-stage cryopanel disposed so as to be surrounded by the inner surface of the first-stage cryopanel together with the accommodation space, and a cryocooler including a first cooling stage thermally coupled to the first-stage cryopanel and a second cooling stage thermally coupled to the second-stage cryopanel, the method comprising:

cooling the first-stage cryopanel to a temperature higher than a condensation temperature of the gas and cooling the second-stage cryopanel to a temperature equal to or lower than the condensation temperature of the gas;

depositing the condensed layer of the gas that enters the accommodation space from outside the cryopump through a cryopump intake port on the second-stage cryopanel; and monitoring an amount of condensed gas in the accommodation space based on a change in the first-stage heat load incident on the inner surface of the first-stage cryopanel from outside the cryopump through the cryopump intake port, wherein the cooling comprises controlling an operating parameter of the cryocooler to cool the first-stage cryopanel to a first-stage target temperature, and wherein the monitoring comprises acquiring the operating parameter of the cryocooler and determining whether or not the amount of condensed gas exceeds a reference value by comparing the operating parameter of the cryocooler with a threshold value.

* * * * *